United States Patent Office 3,460,683
Patented Aug. 12, 1969

3,460,683
CELLULOSE ACETATE MEMBRANES
Charles R. Cannon, Baldwin Park, Calif., assignor to Aerojet-General Corporation, El Monte, Calif., a corporation of Ohio
No Drawing. Filed Aug. 22, 1966, Ser. No. 573,880
Int. Cl. B01d 39/00, 13/04
U.S. Cl. 210—500                    6 Claims

ABSTRACT OF THE DISCLOSURE

A reverse osmosis membrane made from a casting solution comprising cellulose acetate with a critical acetyl content, a polar solvent, water, and no swelling salt.

---

This invention relates generally to reverse osmosis or the separation of water from aqueous solutions and more particularly provides improvements in casting solutions and methods of manufacture of reverse osmosis membrane.

It is known to employ cellulose acetate membranes in a reverse osmosis technique for desalination of water and generally for the separation of water from various aqueous solutions. In one prior art process for the preparation of the membrane, as disclosed in Loeb et al. U.S. Patents 3,133,132 and 3,133,137, the cellulose acetate is dissolved in a suitable organic solvent such as acetone to form a casting solution which in addition contains water and an electrolyte swelling agent for the cellulose ester. Loeb et al. disclose in their patents the use of perchlorate salts preferably magnesium perchlorate, as swelling agents. Water in the casting solution serves a solvating agent and is believed to form with the swelling agent a molecular or ionic complex (a hydrate) which is attracted to the functional groups of the cellulose acetate, thus achieving a swelling of the cellulose. In the manufacture of the membrane, the casting solution is dispersed in a thin film on a suitable casting surface to form the membrane, following which the solvent of the thin film is usually permitted to partially evaporate. the membrane is then set or gelled through a desolvation mechanism by immersion of the film in cold water. The case film which at this stage of manufacture has swollen gel structure is next annealed to accomplish a contraction of the swollen gel structure to provide a tight membrane having the ability to pass water and restrain passage of salt. Prior to annealing, the swollen cellulose ester membrane possesses a primary gel structure which exhibits high water transport and low salt retention. Annealing is a synersis phenomenon, wherein the primary gel structure is shrunk as evidenced by loss of water from the membrane. Annealing may be achieved by immersion of the swollen primary gel structure in a hot water bath. In another annealing procedure, water is extracted from the primary gel structure by a solvent treatment which comprises immersing the swollen primary gel structure in a suitable water-miscible solvent as disclosed in co-pending application of Charles R. Cannon, Paul A. Cantor and William M. King, Ser. No. 528,064, filed Feb. 17, 1966.

Other materials than Loeb's perchlorate salts may be used as swelling agents, for example, certain organic compounds as disclosed in the co-pending application of William M. King and Paul A. Cantor, Ser. No. 521,034, filed Jan. 17, 1966. While water has been recognized as the primary agent responsible for the swelling of the cellulose acetate, it has not heretofore been considered feasible to achieve water swelling without the incorporation of a suitable swelling agent in the casting solution.

The mechanism involved in the formation of the desalination membrane is basically a gelation process, involving the coagulation of the cellulose acetate solution into a comparatively rigid mass which incorporates a large amount of water. It is known that semipermeable cellulose membranes suitable for reverse osmosis operations have a top or active layer and an underlying bottom or substructural layer. The active layer includes that surface of the membrane which first contacts water when the newly-cast membrane is immersed in the cold water bath in the fabrication procedure. The cellulose acetate of the active layer tends to exist as a compacted mass of polymer molecules in contrast to the open cell structure which predominates in the substructure layer. Electronmiscroscopy has shown the membrane to possess a grainy substructure and a relatively clear top layer. Desalination only occurs when the active layer or surface is in contact with the saline solution. It is believed that the thickness of the layer is between approximately 5 and 12% of the total membrane thickness. Typically, the moisture content of the cellulose acetate membrane following annealing (syneresis) is in the range of 50 to 70% of the total weight of the membrane.

It is a principle object of the invention to provide a novel casting solution and a simplified method of manufacturing of cellulose acetate membranes employing no electrolyte swelling agent.

It is a further object of the invention to provide an improved cellulose acetate membrane which is characterized by low salt permeation and relatively high rate of water transport thereacross.

It is a still further object of the invention to provide an improved method of preparing a membrane characterized by an extended life.

It has now been discovered that casting solution formulations need not include a hydrate-forming swelling agent and that casting solutions may be prepared which rely solely on water to achieve the swelling. While water swelling in the absence of a perchlorate or other known swelling agents may be achieved with a fairly wide range of cellulose acetate compositions, the formulation of the invention is more desirably prepared from less highly acetylated cellulose acetate, generally from cellulose acetates having an acetyl content within the range of 37.8 to 40.8% by weight of the cellulose acetate. Preferably, the cellulose acetate employed in the preparation of the casting solution of the invention has an acetyl content within the range of 38.3 to 39.8% and optimumly an acetyl content of about 39.1% by weight of the cellulose acetate. The acetyl range of the cellulose acetate compositions used in the formulations of the invention may be obtained by blending commercially available cellulose acetate compositions. Alternatively, the cellulose acetate composition may be initially prepared by acetylation to give the desired acetyl content without resort to the blending technique. However, it is frequently more convenient to prepare the membrane of the invention by blending commercially available basic types of cellulose acetate. In some instances, the commercially available cellulose acetate may be used without blending. For example Eastman Chemical Products Co., Inc., Kingsport, Tenn., markets a group of lacquer-type cellulose diacetates identified by the type number E-398, E-394, A-393 and E-383, which compositions contain respectively acetyl contents by weight of the cellulose acetate of 39.8%, 39.4%, 39.3% and 38.3%. The cellulose acetate marketed by other organizations such as Celanese Corp. of America are suitable for the preparation of the formulations of the invention, for example, Celanese's cellulose diacetate HLFS-60 having an acetyl content of around 38.3% is usable without blending in the formulations of the invention. It has been experienced that the commercially available acetates have acetyl contents which will slightly vary from batch to batch from the represented acetyl content. In the data reported in this patent application, laboratory analysis have been run to determine the correct acetyl content of the various materials employed.

Heretofore, it has been generally believed that salt retention characteristic of a cellulose acetate membrane was directly related to acetyl content, that is with an increase in the acetyl content of the membrane there should be a direct improvement in salt retention. It was also believed, heretofore, that the ability of a membrane to transport water thereacross was related to acetyl content, that is to say, it was believed that with an increased acetyl content of the cellulose membrane there was proportionally less flux. It has now been found that the membrane of the invention containing the critical and relatively low acetyl range unexpectedly possesses high flux ability and superior salt retention properties.

The solubility of cellulose acetate and organic solvents changes progressively with changes in chemical composition. Cellulose acetate having an acetyl content in the range of 37 to about 41% are readily soluble in typical medium polarity solvents such as acetone, methyl ethyl ketone, methyl acetate, ethyl lactate, and 1,4-dioxane. It will be understood in formulating the casting solution that various solvents may be utilized. Typically, the solvent will be employed in an amount within the range of about 30 to 50 parts by weight per 10 parts of the cellulose acetate. It will be appreciated that the precise amount of solvent will vary with the particular formulation employed and that the amount used will be that required to give a workable casting solution.

Heretofore, it has been generally believed that a swelling agent such as magnesium perchlorate salt was an absolute necessity for the preparation of an acceptable membrane. In the formation of a reverse osmosis membrane, the cellulose acetate is swollen to take on a significant amount of water. Previously, it has not been thought possible to incorporate the required amount of water in a casting solution without the presence of a swelling agent. It has now been found that suitable membranes exhibiting high flux properties and superior salt retention characteristics may be prepared without a swelling agent where the cellulose acetate used has an acetyl content within the aforementioned range of about 37.8 to about 40.8 by weight of the cellulose acetate. For the most part, the membranes of the prior art contained a higher acetyl content than the membrane of the instant invention. In preparation of the casting solution of the invention, the cellulose acetate is first dissolved in the polar solvent and thereafter the solvating water is slowly added with agitation to complete the preparation. The water is generally employed in an amount in the range of about 10 to about 20 parts (usually less than 15 parts) by weight per 10 parts of the cellulose acetate.

The casting solution of the invention may be hand cast or machine cast as known in the art. For example, the casting may be achieved by feeding the casting solution which may be at room temperature through a hollow doctor blade with the blade resting on raised brackets at the edges of a casting surface, e.g. a glass plate maintained at around −10° C. Typically, the blade is pulled across plate at a rate such that the film which is formed has a thickness between 10 and 20 mills. A typical casting rate is around 0.5–10 inches of film per second. Following casting, the film is allowed to dry briefly, for example, around three minutes to permit partial evaporation of the solvent. The length of the drying period will vary considerably with the formulation employed. During the casting operation, the doctor blade and casting surface, which may be a glass plate are maintained generally at a low temperature, for example, around −10° C. in the instance of an acetone solution. It is known that certain plastic surfaces in contrast to a glass plate may be maintained at higher temperatures, for example, around room temperature.

Following casting of the film and the partial evaporation of the solvent, the casting glass plate and the film thereof are dipped into cold water which may range in temperature from 0 to about 10°. For an acetone solution the temperature is preferably maintained at about 0° C. The casting plate is then thrust into the cold water bath with one continuous motion with the plate making an angle of about 30° to about 60° with the surface of the water. A film will soon float off the glass casting plate, at which time it will be strong enough to manipulate. The film is rolled up in a damp state. If the film should dry, it will lose its desirable properties and is unsuitable for desalination. It will be understood that the conditions employed in the manufacture of the swollen film will vary considerably depending upon the technique used and the composition of the casing solution and whether the film is being produced on the continuous or batch basis.

EXAMPLE I

In this example, the several membranes were prepared from commercially available cellulose acetate or blends of commercially available materials. All casting solutions contain 20 grams of cellulose acetate (single or blend), 80 grams of acetone, and 27 grams of water. Fabrication of the membranes included casting at −10° C., immersion in a 0° water bath and a heat treatment (annealing) for 3 to 5 minutes in a water bath maintained at a temperature of 89° C. In this example the membranes were cast by hand in the fashion described above. The membranes were then tested in a standard reverse osmosis test apparatus operated at 1500 p.s.i.g. using a 3.5% sodium chloride water solution (35,000 p.p.m.). The results of the test are set forth in Table I below.

TABLE I

| Blend or single material | Wt. ratio, percent | Percent acetyl | Flux, g.f.d. | NaCl, p.p.m. |
|---|---|---|---|---|
| E383–40 (only) | 20 | 37.8 | 14 | 1,100 |
| E383–40/HLFS–60 | 16/4 | 37.9 | 13 | 960 |
| E383–40/HLFS–60 | 12/8 | 38.0 | 12 | 800 |
| HLFS–60 (only) | 20 | 38.3 | 10.7 | 520 |
| E383–40/E398–3 | 12/8 | 39.0 | 12 | 610 |
| E383–40/E398–3 | 11.12/8.88 | 39.1 | 11.5 | 460 |
| E398–3/HLFS–60 | 6.4/13.6 | 39.1 | 10 | 475 |
| E398–3 (only) | 20 | 40.8 | 5 | 500 |

The first membrane recorded in the table was prepared from a commercially available cellulose acetate at the Eastman Chemical Products, Inc., identified as E383–40 By laboratory analysis it was established that this particle batch of cellulose acetate had an actual acetyl content of 37.8%. The second membrane was formed of a blend of two commercially grade cellulose acetates identified namely as E383–40 and HLFS–60 with the former material being present in an amount of 16 grams and the HLFS–60 in an amount of 4 grams. The actual acetyl contant of the blend is 37.9. The preferred membrane of this example proved to be the membrane formed of a blend of E383–40 and E398–3 with the former present in the amount of 11.12 grams and the latter in an amount of 8.88 grams. The preferred membrane had an actual acetyl content of 39.1 and exhibited a flux of 11.5 gallons per square foot per day and a salt permeation of 460 parts per million in the product water. It will be seen that another membrane having an acetyl content of 39.1 (same as the preferred membrane) was prepared from a somewhat different blend of commercially available acetates. The cellulose acetates designated by E numbers are those of Eastman Chemical Products and the HLFS–60 cellulose acetate is marketed by Celanese Corporation.

I claim:
1. A reverse osmosis membrane casting solution consisting essentially of a film forming cellulose acetate having an acetyl content in the range of about 37.8% to about 40.8% by weight of the cellulose acetate, a water-miscible polar solvent for the cellulose acetate with the polar solvent being present in an amount of about 30 to 50 parts by weight per 10 parts of cellulose acetate, and water, said water being present in an amount within the range of about 10 to about 20 parts by weight per 10 parts of cellulose acetate and said casting solution being further characterized in containing no salt swelling agent.

2. A casting solution in accordance with claim 1 wherein the water is present in an amount of about 10 to about 15 parts by weight per 10 parts of cellulose acetate.

3. A casting solution in accordance with claim 1 wherein the cellulose acetate has an acetyl content in the range of 38.3 to 39.8% by weight of the cellulose acetate.

4. A casting solution in accordance with claim 3 wherein the acetyl content of the cellulose is about 39.1%.

5. A cellulose acetate reverse osmosis membrane characterized by having an acetyl content in the range of about 37.8% to about 40.8% by weight of the cellulose acetate and containing no salt swelling agent, said membrane being produced from a casting solution consisting essentially of a film forming cellulose acetate having an acetyl content in the range of about 37.8% to about 40.8% by weight of the cellulose acetate, a water-miscible polar solvent for the cellulose acetate with the polar solvent being present in an amount of about 30 to 50 parts by weight per 10 parts of cellulose acetate, and water with the water being present in an amount within the range of about 10 to about 20 parts by weight per 10 parts of cellulose acetate and said casting solution being further characterized in containing no salt swelling agent.

6. A casting solution in accordance with claim 5 wherein the water is present in an amount of about 10 to about 15 parts by weight per 10 parts of cellulose acetate.

References Cited

UNITED STATES PATENTS

| 2,926,104 | 2/1960 | Goetz | 117—65 |
| 3,133,132 | 5/1964 | Lueb et al. | 264—49 |

FOREIGN PATENTS

| 134,228 | 2/1921 | Great Britain. |

OTHER REFERENCES

Banks et al., "The Mechanism of Desalination by Reverse Osmosis, and its Relation to Membrane Structure," Office of Saline Water R. & D. Report No. 143, June 1964, received by Patent Office Oct. 7, 1965, 84 pp., pp. 60–62 relied on, copies may be ordered from the Sup't. of Documents, Washington, D.C.

Manjikian et al., "Improvement in Fabrication Techniques for Reverse Osmosis Desalination Membranes," presented at the First International Symposium on Water Desalination, held Oct. 3–9, 1965, Washington, D.C., 20 pp., pp. 1–14 relied on.

Pierce, "Nitrocellulose Membranes of Graded Permeability," from J. Biol. Chem., vol. 75, No. 3, 1927, pp. 795–807 relied on.

REUBIN FRIEDMAN, Primary Examiner

F. A. SPEAR, Jr., Assistant Examiner

U.S. Cl. X.R.

106—196; 264—41